M. H. KRUGER.
Apparatus for Filtering and Refining Oil.
No. 60,747. Patented Jan. 1, 1867.
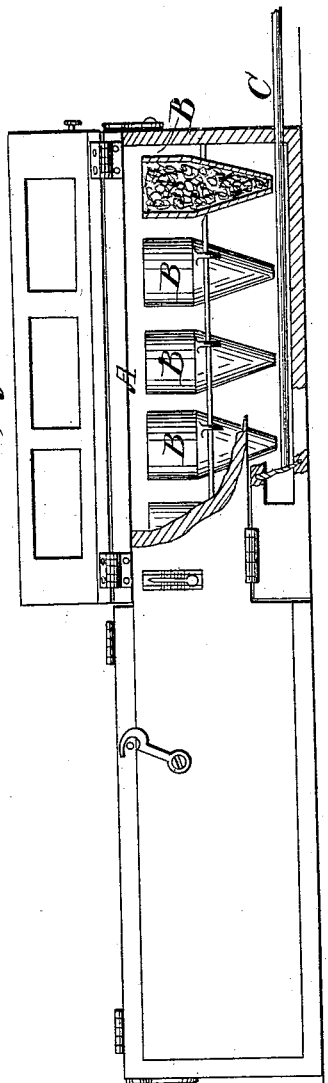
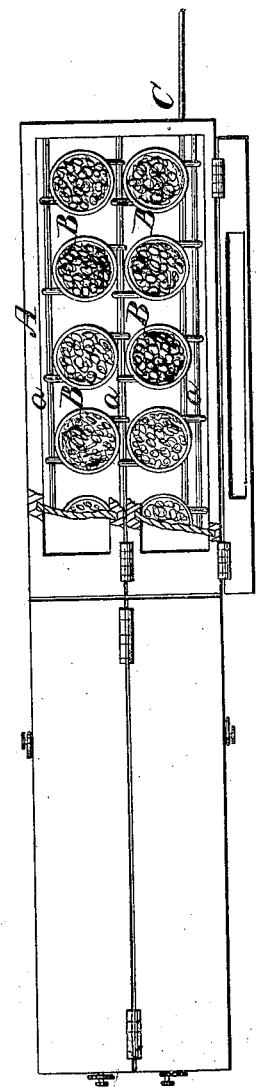

United States Patent Office.

MAX H. KRÜGER, OF NEW YORK, N. Y.

Letters Patent No. 60,747, dated January 1, 1867.

---

IMPROVED APPARATUS FOR FILTERING AND REFINING OIL.

---

The Schedule referred to in these Letters Patent and making part of the same.

---

TO ALL WHOM IT MAY CONCERN:

Be it known that I, MAX H. KRÜGER, of the city, county, and State of New York, have invented a new and useful improvement in Refining Oil, etc.; and I do hereby declare that the following is a full, clear, and exact description thereof, which will enable others skilled in the art to make and use the same, reference being had to the accompanying drawings, forming part of this specification, in which—

Figure 1 represents a sectional side elevation of this invention.
Figure 2 is a sectional plan or top view of the same.
Similar letters of reference indicate like parts.

This invention relates to an apparatus which is intended for deodorizing and refining petroleum and other hydro-carbon liquids. It consists of a series of filters, which are filled with powdered charcoal or other suitable material, and hung on rods in the interior of a chamber or box, which can be filled with steam in such a manner that the petroleum or other hydro-carbon liquid, while passing through the filtering material, is kept at a sufficiently high temperature to prevent the resinous parts contained in said oil from choking up the filters, and the operation of filtering can be conducted with ease and facility.

A represents a box or chamber, made of wood or any other suitable material, and of any convenient shape and size. The top and sides of this box are provided with panes of glass, through which the interior of the same can be inspected, and a thermometer inserted in one of its sides allows of controlling the temperature in the interior of the box. Through the box A extend three (more or less) rods, $a$, and from these rods are suspended the filters B. These filters are made of sheet metal or any other suitable material, and they are furnished with suitable hooks by which they can be hung on the rods $a$, as shown in the drawing. When the apparatus is to be put in operation the filters are filled with charcoal or other suitable material, and the oil or other liquid to be deodorized or refined is made to run through the several filters. The temperature in the interior of the box A is regulated by a steam pipe, C, which passes into said box near its bottom, and which may be arranged in the form of a coil or in any other suitable shape. For refining or deodorizing petroleum a temperature of about 210° is required. If the temperature is much lower than the above the oil does not run freely, and the filters are liable to become choked; and if the temperature is much higher than 210° the oil passes through the filters without being deprived of its impurities; in fact, if the heat is too great the color of the oil becomes darker, as the same passes through the filters, and its value is decreased instead of improved. By keeping the temperature at the proper point the oil passes freely through the filter, and the coloring matter contained therein, as well as the odor, are retained by the filtering material, so that the oil discharges from the filters free from color (or nearly so) and almost entirely free from odor.

In practice, two or more boxes will be arranged side by side, so that one man is enabled to attend to a large number of filters, and that, in case it becomes necessary to clean the filters, each box can be emptied without interrupting the process in the adjoining boxes.

What I claim as new, and desire to secure by Letters Patent, is—

The movable filters B, suspended from rods $a$, within the steam box A, for the purpose described, substantially as specified.

The above specification of my invention signed by me this 14th day of November, 1866.

MAX H. KRÜGER.

Witnesses:
WM. F. McNAMARA,
ALEX. F. ROBERTS.